United States Patent [19]
Gordon et al.

[11] Patent Number: 5,392,325
[45] Date of Patent: Feb. 21, 1995

[54] METHOD AND APPARATUS FOR LOCAL PROTECTION OF PIPING SYSTEMS FROM STRESS CORROSION CRACKING

[75] Inventors: Gerald M. Gordon, Soquel; Beth Ann McAllister; James H. Terhune, both of San Jose; James E. Charnley, Gilroy, all of Calif.

[73] Assignee: General Electric Company, San Jose, Calif.

[21] Appl. No.: 66,850

[22] Filed: May 21, 1993

[51] Int. Cl.$^6$ .............................................. G21C 9/00
[52] U.S. Cl. .................................... 376/301; 376/305; 422/7
[58] Field of Search ................... 422/177, 7, 83, 80; 376/300, 301, 305

[56] References Cited
U.S. PATENT DOCUMENTS

| | | | |
|---|---|---|---|
| 2,863,729 | 12/1958 | McDuffie | 23/204 |
| 2,945,794 | 7/1960 | Winters et al. | 204/154.2 |
| 2,961,391 | 11/1960 | King | 204/193.2 |
| 3,663,725 | 5/1972 | Pearl | 176/38 |
| 3,713,281 | 1/1973 | Asker et al. | 55/387 |
| 3,857,927 | 12/1974 | Henrie | 423/580 |
| 3,859,053 | 1/1975 | Parnes | 23/288 R |
| 4,014,984 | 3/1977 | Parnes | 423/580 |
| 4,139,603 | 2/1979 | Weems et al. | 423/580 |
| 4,171,350 | 10/1979 | Sanders | 423/580 |
| 4,226,675 | 10/1980 | Lewis et al. | 176/19 R |
| 4,228,132 | 10/1980 | Weems et al. | 422/174 |
| 4,282,062 | 8/1981 | Stiefel et al. | 176/37 |
| 4,374,083 | 2/1983 | Deinlein et al. | 376/306 |
| 4,448,833 | 5/1984 | Yamaguchi et al. | 428/116 |
| 4,574,071 | 3/1986 | deSilva et al. | 422/14 |
| 4,789,488 | 12/1988 | deSilva | 210/750 |
| 4,842,811 | 6/1989 | Desilva | 376/301 |
| 4,911,879 | 3/1990 | Heck et al. | 376/301 |
| 5,130,081 | 7/1992 | Niedrach | 376/305 |
| 5,135,709 | 8/1992 | Andresen et al. | 376/305 |
| 5,147,602 | 9/1992 | Andresen et al. | 420/35 |
| 5,287,392 | 2/1994 | Cowan, II et al. | 376/301 |
| 5,301,217 | 4/1994 | Heck et al. | 376/301 |

FOREIGN PATENT DOCUMENTS

| | | |
|---|---|---|
| 0240796 | 3/1987 | Europe |
| 0298943 | 1/1989 | Europe |
| 0467110 | 6/1991 | European Pat. Off. ........ C01B 5/00 |

OTHER PUBLICATIONS

Cowan et al., "U.S. Experience with Hydrogen Water Chemistry in BWRs", Japan Atomic Ind. Forum Water Chem. Conf., Tokyo (1988).

Cowan et al., "Experience with hydrogen water chemistry etc.", Water Chem. for Nucl. Reactor Systems 4, BNES, London (1986), 29–.

(List continued on next page.)

Primary Examiner—Donald P. Walsh
Assistant Examiner—Meena Chelliah
Attorney, Agent, or Firm—J. E. McGinness

[57] ABSTRACT

A catalytic recombiner device for reacting two or more molecular species having dilute concentrations in fluids flowing in pipes at elevated temperatures. The species are stable in the bulk fluid, but because of a high electrochemical potential, the species create conditions favorable to stress corrosion cracking in the pipe walls. If the pipe forms a portion of a coolant system, as in a nuclear power plant, the dissolved chemical species are transported and distributed throughout the system with undesirable consequences. To reduce the electrochemical potential, a cartridge having catalytic surfaces is installed in the flow upstream of the component to be protected against stress corrosion cracking. The catalytic surfaces of the cartridge form a small amount of benign reaction product (e.g. water), thereby reducing the concentration of undesirable species. The presence of a compact catalytic recombiner at strategic locations substantially reduces the electrochemical potential and protects both the piping and the vessels and internals connected to the piping from corrosive attack.

14 Claims, 6 Drawing Sheets

OTHER PUBLICATIONS

Ullberg et al., "Hydrogen Peroice in BWRs", Water Chem. for Nucl. Reactor Systems, 4, BNES, London (1977), pp. 67–73.

Ruiz et al., "Model Calculations of water radiolysis in BWR primary coolant," Water Chem. of Nucl. Reactor Systems 5, BNES, London (1989), pp. 131–140.

BWR Hydrogen Water Chemistry Guidelines: 1987 Revision, EPRI NP-4947-SR, Dec. 1988.

Rao et al., "Protective coatings for radiation control etc.," J.Vac.Sci.Technol. A 5(4), Jul./Aug. 1987, pp. 2701–2705.

Kim et al., "The Application of Noble Metals in Light-Water Reactors", JOM, Apr. 1992, pp. 14–18.

Niedrach, "Effect of Palladium Coatings on the Corrosion Potential of Stainless Steel etc.", Corrosion, vol. 47, No. 3 (1992), pp. 162–169.

Rogers et al., "Catalytic recombiners for BWRs", Nucl. Eng. Int'l, Sep. 1973, pp. 711–715.

Indig et al., "Mitigation of SCC in an operating BWR via $H_2$ injection", Int'l Corrosion Forum, Anaheim, Apr. 1983.

Jones et al., "Controlling SCC in BWR Piping by Water Chemistry Modification", NACE Symposium, Corrosion '84, New Orleans, 1984.

Kim et al., "Method for Reducing Flow Assisted Corrosion of Carbon Steel Components", U.S. Patent 5,164,152 filed on Aug. 2, 1991.

Sherwood et al., "Mass Transfer", McGraw-Hill, pp. 25–32.

Rohsenow et al., "Heat, Mass, and Momentum Transfer," Prentice-Hall (1961), Chap. 14.

Bird et al., "Transport Phenomena", John Wiley (1964), Sec. 16.5.

Schlichting, "Boundary Layer Theory" (1955), p. 452.

METHOD AND APPARATUS FOR LOCAL PROTECTION OF PIPING SYSTEMS FROM STRESS CORROSION CRACKING

FIELD OF THE INVENTION

This invention generally relates to the catalytic reaction of two or more molecular species having dilute concentrations in fluids flowing in pipes at elevated temperatures. In particular, the invention relates to reducing the corrosion potential of components exposed to high-temperature (i.e., about 150° C. or greater) water.

BACKGROUND OF THE INVENTION

In a boiling water reactor ("BWR"), the high-temperature (~288° C.) water coolant is highly oxidizing due to dissolved radiolytically produced chemical species, such as oxygen and hydrogen peroxide. These molecules and/or compounds are generated as water passes through the reactor core and is exposed to very high gamma and neutron flux levels. Because of the resultant high electrochemical potential ("ECP"), reactor structural materials, such as stainless steels and nickel-based alloys, can suffer stress corrosion cracking ("SCC").

It is well known that SCC occurs at higher rates when oxygen is present in the reactor water in concentrations of about 5 ppb or greater. Stress corrosion cracking is further increased in a high radiation flux where oxidizing species, such as oxygen, hydrogen peroxide, and short-lived radicals are produced from radiolytic decomposition of the reactor water. Such oxidizing species increase the ECP of metals. Electrochemical corrosion is caused by a flow of electrons from anodic and cathodic areas on metallic surfaces. The ECP is a measure of the thermodynamic tendency for corrosion phenomena to occur, and is a fundamental parameter in determining rates of, e.g., SCC, corrosion fatigue, corrosion film thickening, and general corrosion.

The useful lifetime of reactor components, such as piping and pressure vessel internal structures, can be limited by SCC. To date, SCC has resulted in a large inspection and repair cost in the nuclear industry and could eventually lead to premature decommissioning of BWR plants due to economic considerations.

A number of countermeasures have been developed to mitigate SCC in BWRs by sufficiently reducing either the stress level, the material susceptibility to cracking, or the "aggressiveness" of the environment. Of the various mitigation strategies, reducing the environmental aggressiveness (i.e., oxidizing potential) can provide the broadest, most comprehensive approach, since the environment contacts all the potentially susceptible surfaces of interest. The primary strategy to reduce the ECP of the water to some benign value has been to add hydrogen gas to the reactor feedwater in sufficient quantity that hydrogen is available to chemically recombine, in the presence of a radiation field, with dissolved oxygen and hydrogen peroxide to form water. This process is called hydrogen water chemistry (HWC).

If the hydrogen concentration is sufficient, the resultant ECP can be reduced below the SCC threshold value. As used herein, the term "threshold value" means a corrosion potential at or below a range of values of about −230 to −300 mV based on the standard hydrogen electrode ("SHE") scale. Stress corrosion cracking proceeds at an accelerated rate in systems in which the ECP is above the critical potential, and at a substantially lower rate in systems in which the ECP is below the critical potential. Water containing oxidizing species such as oxygen increases the corrosion potential of metals exposed to the water above the critical potential, whereas water with little or no oxidizing species present results in corrosion potentials below the critical potential.

In a BWR, the radiolysis of the primary water coolant in the reactor core causes the net decomposition of a small fraction of the water to the chemical products $H_2$, $H_2O_2$ and $O_2$. For steady-state operating conditions, equilibrium concentrations of $O_2$, $H_2O_2$, and $H_2$ are established in both the water which is recirculated and the steam going to the turbine. This concentration of $O_2$, $H_2O_2$, and $H_2$ is oxidizing and results in conditions that can promote SCC in susceptible structural materials.

When HWC is used to make the bulk coolant sufficiently reducing, the nitrogen isotope $^{16}N$, which is normally present in the water phase during reactor operation, partitions into the steam phase. This results in an increase in $^{16}N$ gamma activity in the steam lines and turbine systems, which can exceed regulatory personnel radiation exposure limits at hydrogen addition levels needed for broad SCC protection. To reduce the $^{16}N$ gamma activity to acceptable levels at these plants, it is now necessary to add shielding at strategic locations, which can be costly. In most cases, this consideration has limited use of HWC to protection of only those components where the ECP can be reduced below the SCC threshold without a significant increase in steam-phase $^{16}N$.

SUMMARY OF THE INVENTION

The present invention is a method and apparatus for protecting selected high-cost-impact reactor systems, such as piping, against SCC by reducing the ECP of these systems without an unacceptable increase in steam-phase $^{16}N$. The apparatus is a catalytic recombiner installed upstream of the piping or other system requiring SCC protection. The recombiner will facilitate the reaction of a small (stoichiometric) hydrogen addition with the dissolved oxygen and hydrogen peroxide present in the water entering the selected system. Thus, the ECP of the water exiting the recombiner will be reduced below the SCC threshold value and SCC will be prevented downstream of the recombiner at all system locations up to the point where the water either mixes with coolant containing higher concentrations of oxygen and/or hydrogen peroxide, or again passes through the reactor core, where radiolysis reoccurs.

The instant invention consists of a catalytic recombiner constructed from a material with a catalytically active surface that facilitates the recombination of dissolved oxygen and hydrogen peroxide with hydrogen which is added as a gas to the water upstream of the recombiner. To increase the catalytic recombiner efficiency, the active surface area must be maximized per unit flow volume, consistent with the allowed system pressure drop. For any given system being protected, the allowable pressure drop increase due to the presence of the recombiner is set by the system design.

To accomplish this chemical reaction process, the invention utilizes a recombiner having a high surface-to-volume ratio and constructed from a noble-metal alloy known to be an efficient catalyst in high-temperature water. The recombiner is constructed of relatively thin metal sheets of noble-metal alloy (e.g., at least about 1 wt. % palladium in stainless steel), fabricated into shells, plates, or continuous strips and configured to allow insertion into the upstream portion of the system to be protected.

The recombiner may take the form of a cartridge of compact, rugged, modular design that can be designed for a wide range of pipe sizes and flow velocities. The recombiner structure includes means for mixing reactants between channels of the mass exchanger, thereby minimizing segregation and enhancing overall efficiency.

The catalytic recombiner is arranged and situated such that all (except perhaps a small leakage flow) water phase which ultimately flows through the component to be protected will first flow over the surfaces of the catalytic material. The catalytic surfaces react with the water radiolysis products $O_2$ and $H_2O_2$ in the liquid phase to form $H_2O$ in accordance with reactions such as (but not limited to) the following:

(1)

(2)

(3)

Reaction (3) is followed by reaction (1) to produce water.

Thus, the catalytic recombiner of the invention provides a means for substantially reducing oxygen concentration in fluids, thereby lowering the ECP and reducing the likelihood of SCC in susceptible downstream components.

Although the invention is disclosed in the context of BWRs, it can be used with compressible or incompressible fluids, such as air or water at elevated temperatures, in a variety of technical applications that involve the catalytic reaction of undesirable compounds in solution. For example, the principle of the invention can be applied in systems for converting CO in exhaust systems (such as catalytic converters on automobiles) or systems for converting $CO_2$ into $H_2O$ (such as scrubbers in fossil fuel plants).

DETAILED DESCRIPTION OF THE PREFERRED EMBODIMENTS

In accordance with a first preferred embodiment of the invention suitable for installation in pipe 50 of circular cross section, a catalytic recombiner cartridge 52 (see FIGS. 1A and 1B) comprises a first plurality of concentric thin cylindrical shells 54 supported between spacers 56 and 56' and a second plurality of concentric thin cylindrical shells 54' supported between spacers 56' and 56", for example, by spot welding or brazing. The shells are made of catalytic material. Each spacer comprises a number (e.g., four) of planar fins, each fin being welded at one end to a central rod 58 positioned along the axis of the concentric shells. Rod 58 resists torquing of the spacers relative to each other. The fins may be disposed at equiangular intervals, e.g., 90°.

Figure 1A:
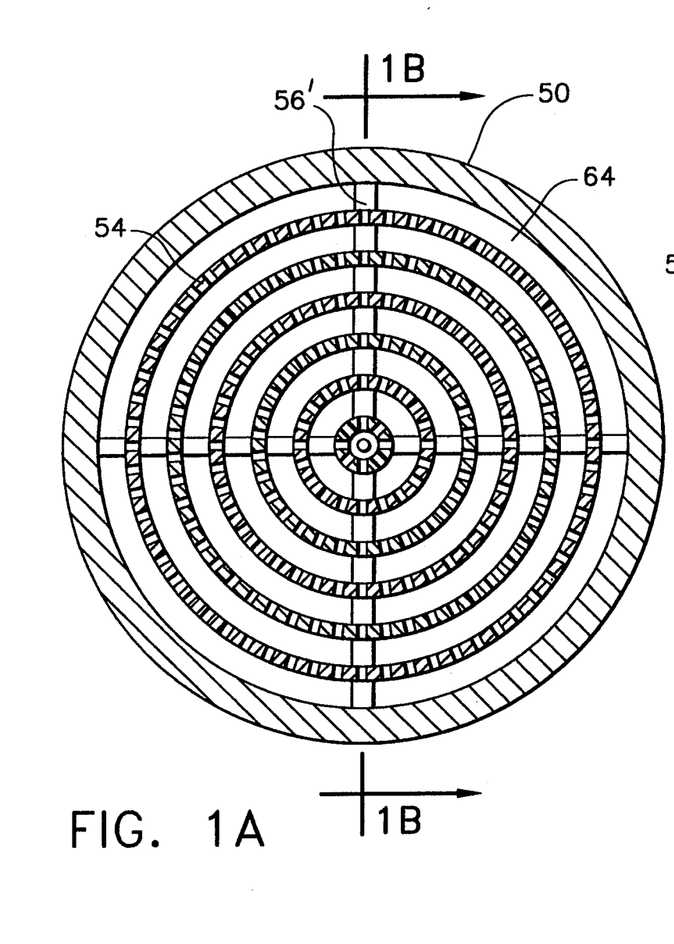
FIGS. 1A and 1B are transverse and longitudinal sectional views respectively of a catalytic recombiner cartridge in accordance with a first preferred embodiment of the invention installed in a pipe.
Figure 1B:
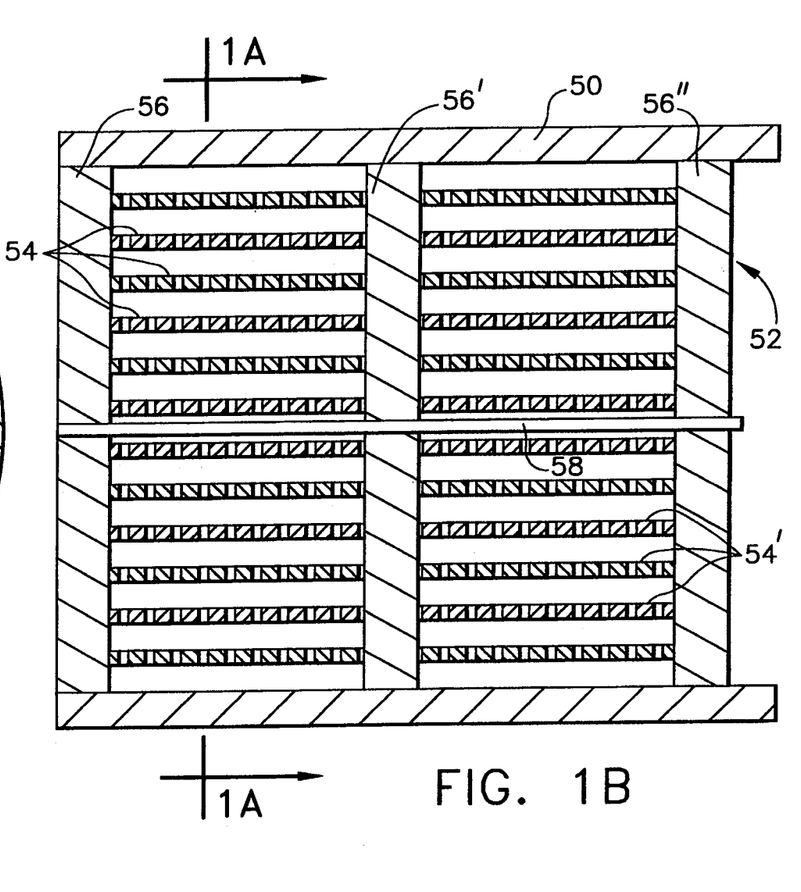

The cylindrical shells 54 are formed from thin sheets (e.g., 10–12 mils thick) made of noble metal-doped alloy (e.g., stainless steel doped with at least about 1 wt. % palladium) and provided with a multiplicity of means for generating turbulence. The spacers and central rod may also be made of catalytic material provided with turbulence generating means. The sheets are rolled into a cylindrical shape and then welded (not shown) along the overlapping edges to form a cylindrical shell. The cylindrical shells are then welded (not shown) to the supporting structure, i.e., spacers 56, 56' and 56" welded to central rod 58, to form a cartridge 52 which is installed inside pipe 50 with the surfaces of shells 54 lying generally parallel to the direction of fluid flow. The spacers function to stiffen the concentric shells against flow-induced vibration and to maintain the shells in concentric relationship with channels 64 therebetween. The spacing between adjacent shells is preferably constant, e.g., about 25 mils.

Although the preferred embodiment shown in FIG. 1B comprises first and second pluralities of concentric cylindrical shells, it will be appreciated that the invention also encompasses a single plurality of shells supported between a pair of spacers.

In accordance with the method of the invention, $H_2$ gas is injected into the flow at a point immediately upstream of installed cartridge 52. The fluid flowing through pipe 50 should be $H_2$-enriched to provide an adequate supply of $H_2$ for the catalytic recombination of water at the surfaces of shells 54. As a result of this catalytic recombination, the concentrations of $O_2$ and $H_2O_2$ in the fluid exiting cartridge 52 will be reduced to a level whereat the ECP is below the SCC threshold value, thereby reducing the susceptibility to SCC of components immediately downstream of the cartridge.

Figure 1C:
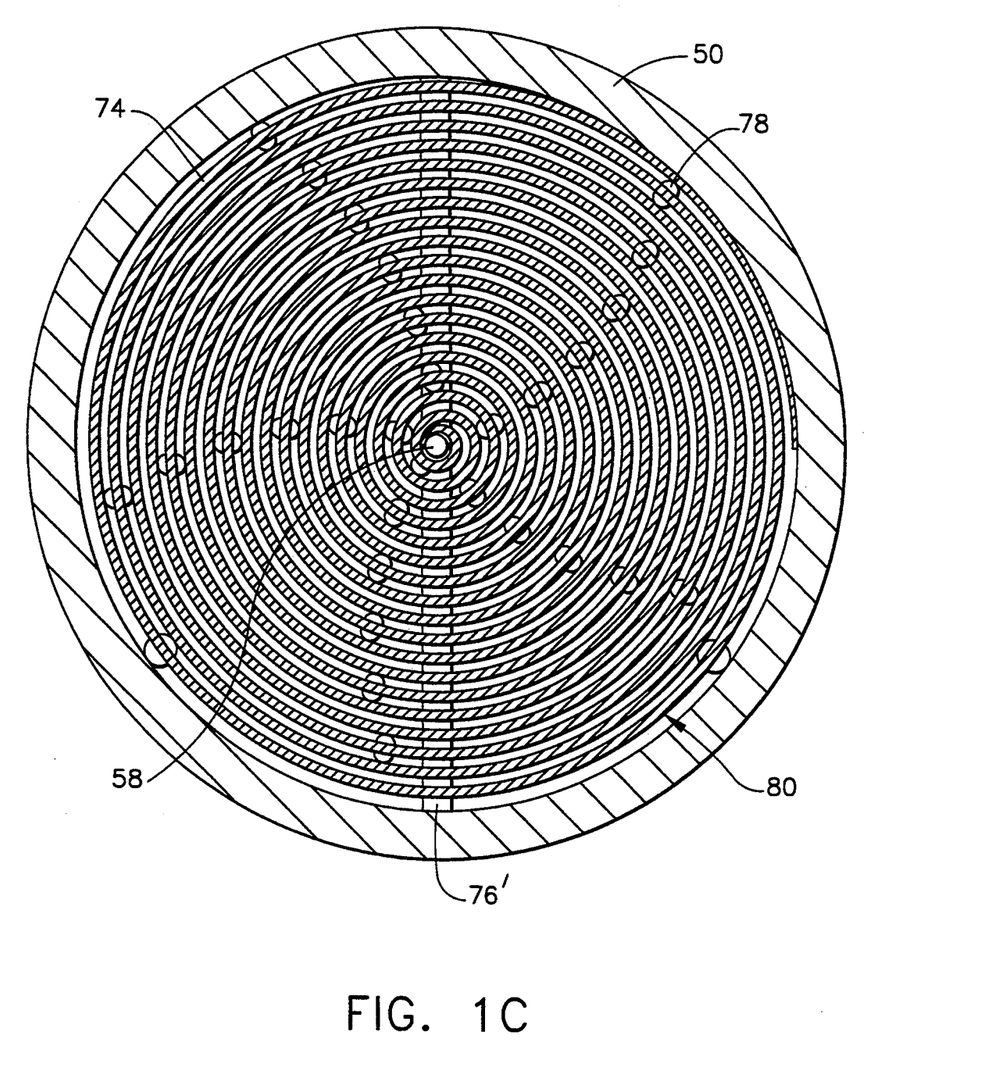
FIG. 1C is a transverse sectional view of a catalytic recombiner cartridge in accordance with a second preferred embodiment of the invention installed in a pipe.

In accordance with a second preferred embodiment of the invention suitable for installation in piping of circular or elliptical cross section, a catalytic recombiner cartridge 80 (see FIG. 1C) comprises a thin sheet 74 fabricated into a helix and welded at its inner edge to a central rod 58 which is supported at both ends inside the pipe 50 by a pair of support members, only one (76') of which is shown. The helix is wound tightly around the central rod and then released to spring into place inside the pipe. In addition to being provided with turbulence generating means, such as perforations (not shown), the sheet 74 has hemispherical spacer bumps 78 for maintaining successive turns of the helix with predetermined spacing.

In accordance with a third preferred embodiment suitable for installation in piping of rectangular, square or irregular cross section, a catalytic recombiner cartridge 66 (see FIG. 2A) can be formed by welding a plurality of hexagonal units into a honeycomb array. As shown in FIGS. 2B and 2C, each hexagonal unit comprises a hexagonal shell 68 having spacers 72, 72' and 72" which support first and second pluralities of thin planar sheets 70 and 70'. The thin planar sheets 70 and 70' are spot welded or brazed to the shell as well as to the spacers. The thin sheets (e.g., 10–12 mils thick) are made of noble metal-doped alloy (e.g., stainless steel doped with at least about 1 wt. % palladium) and are provided with a multiplicity of means for generating turbulence. The spacing between adjacent sheets is preferably constant, e.g., about 25 mils.

Figure 2A:
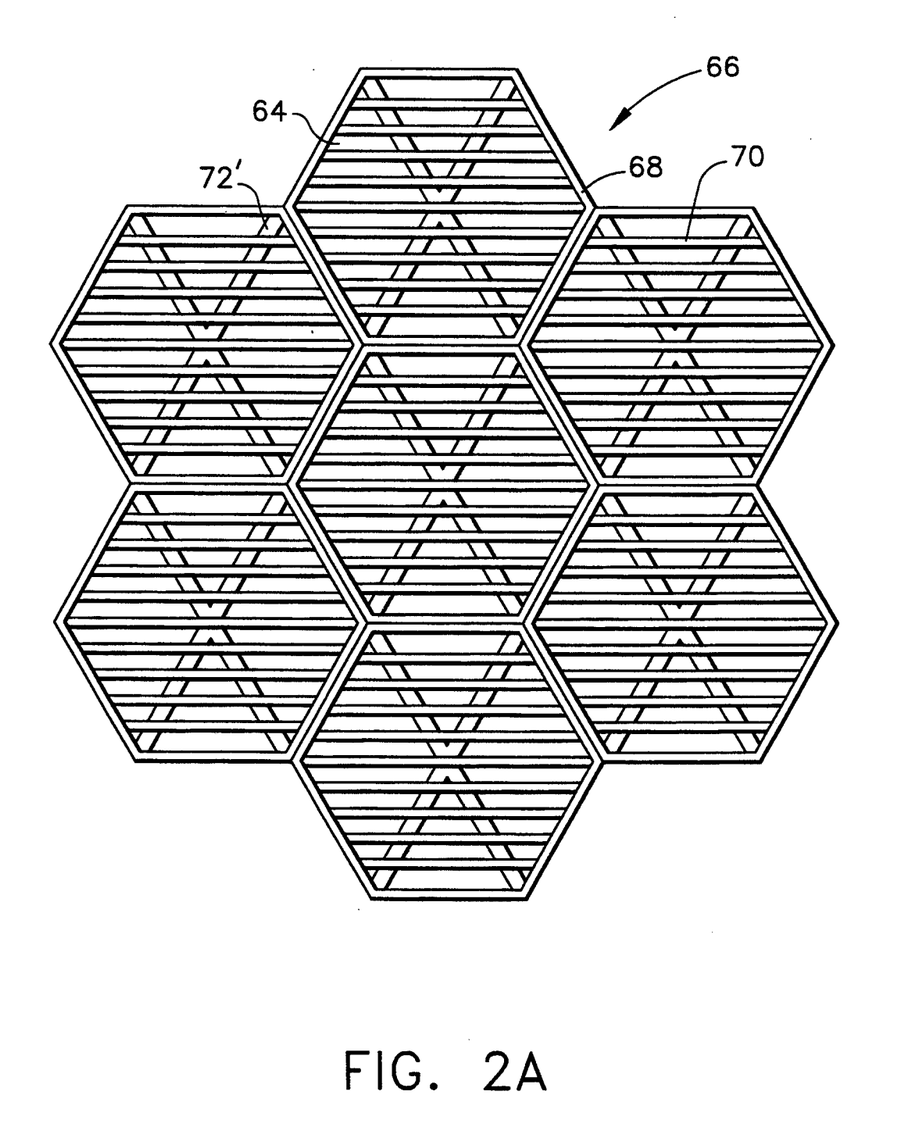
FIG. 2A shows a catalytic recombiner cartridge in accordance with a third preferred embodiment of the invention.
Figure 2B:
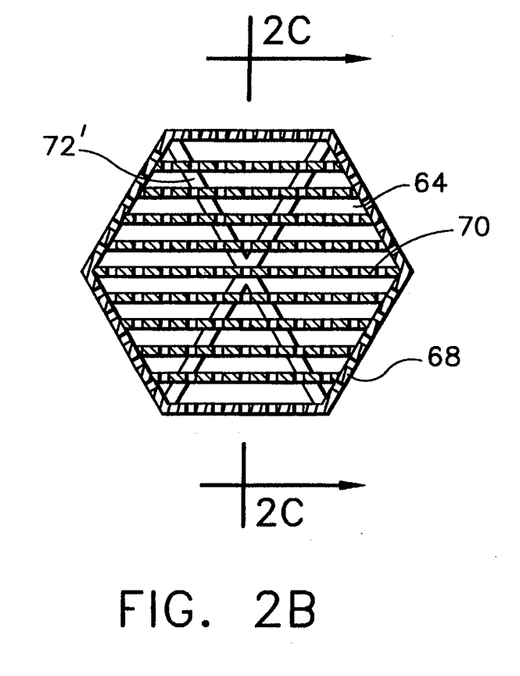
FIGS. 2B and 2C are transverse and longitudinal sectional views respectively of a hexagonal unit which can be assembled to form the cartridge shown in FIG. 2A.
Figure 2C:
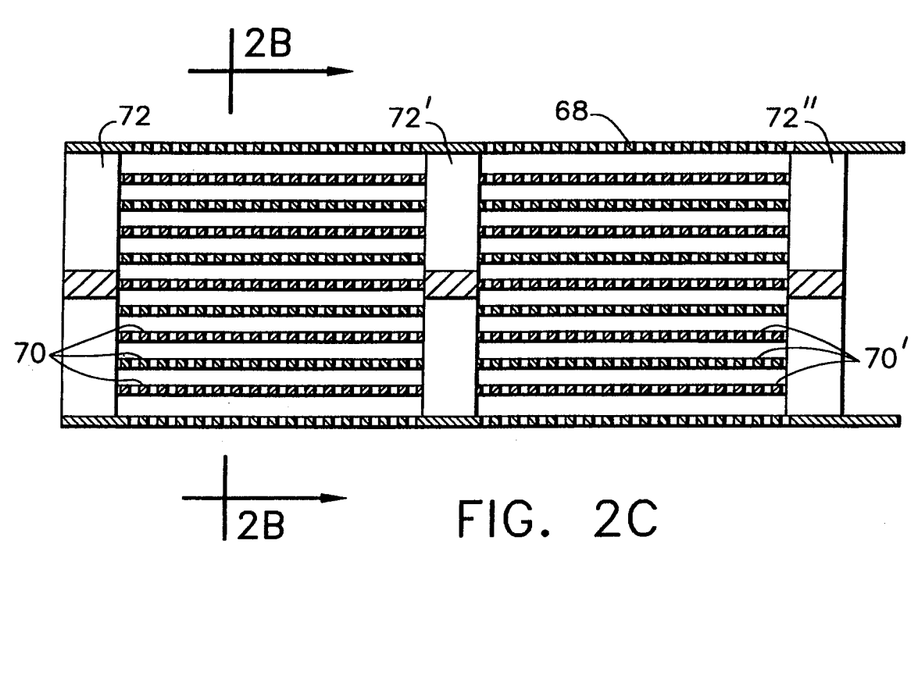

Each spacer has four planar fins welded in an X shape, with the outer tips of the fins being welded to four of the six vertices of the hexagonal shell 68, as shown in FIG. 2A. The spacers and the hexagonal shell may also be made of catalytic material provided with turbulence generating means.

Although the preferred embodiment shown in FIG. 2B comprises first and second pluralities of parallel planar sheets, it will be appreciated that the invention also encompasses a single plurality of sheets supported between a pair of spacers.

The turbulence generating means function to repeatedly interrupt the boundary layer in fluid flowing along the sheet surfaces. Such turbulence generating means are disclosed in a concurrently filed and commonly assigned U.S. patent application entitled "Catalytic Reactor Element", the disclosure of which is incorporated by reference herein. In accordance with the preferred embodiment disclosed therein, each element of the catalytic reactor is a perforated thin sheet of catalytic material having a multiplicity of small holes, preferably circular holes of equal diameter. The holes can be formed by punching and deburring. The holes are distributed over the sheet in a pattern of staggered rows extending transverse to the direction of fluid flow. The distance between the staggered rows is greater than the distance between holes in each row.

This arrangement of perforations optimizes the performance of the elements of the catalytic recombiner in accordance with the invention by limiting boundary layer growth and, at the same time, facilitating communication and mixing of the reactants between flow channels, without introducing an excessive pressure drop in the bulk fluid. In particular, the perforations repeatedly break up the fluid boundary layers on the surfaces of the catalytic reactor elements, which layers block diffusion of the reactants to the surface of the catalytic material. Second, the perforations provide turbulent paths which cause fluid in one flow channel to mix with fluid in another flow channel, thereby preventing formation of local zones of reactant depletion. However, the turbulence generating means need not be holes. Dimples and protuberances (e.g., in the shape of hemispheres) can also be distributed over the sheet surfaces in a pattern of staggered rows. Protuberances can also perform the function of spacers. Although dimples and protuberances are less desirable than holes because the former do not provide mixing of fluid between flow channels, the benefits of disrupting the boundary layer would be realized.

Recombiner design in accordance with the invention is effected using general principles of mass transfer which are known in the art. The design process involves selection of material and dimensions so that outlet concentration ratio and pressure drop are consistent with required criteria. In addition, size, weight, accessibility, etc. are important aspects of the design. The key points will be illustrated for typical dimensions and for recombination of water from hydrogen and oxygen, although the results are similar for other species.

The outlet concentration ratio for a catalytic recombiner cartridge in accordance with the invention is determined by a mass balance across the recombiner, which yields:

$$ln[C/C_o] = [1 - n\pi d_p^2/4][4L/D_h][a - be^{-CRe}]Sc^{-0.67}Re^{-0.54}$$

where:

$$Re = \frac{D_h V_0}{\nu}; \quad Sc = \frac{\nu}{2}\left[\frac{1}{D_{O2}} + \frac{1}{D_{H2}}\right]; \quad D_h = \frac{d_i}{N_0} - t$$

and $a \approx 0.77$; $b \approx 0.59$; $c \approx 1/3570$; $D_{O2}$ and $D_{H2}$ are the diffusion coefficients of $O_2$ and $H_2$, respectively; $D_h$ is the mass transfer diameter; $\nu$ is the fluid kinematic viscosity; $V_0$ is the bulk fluid velocity; Re and Sc are the Reynolds and Schmidt numbers, respectively; $d_i$ and L are the diameter and length of the cartridge, respectively; $N_0$ is the number of concentric shells in the cartridge; t is the shell thickness; n is the number of perforations per unit area of element; and $d_p$ is the perforation diameter.

An important design consideration is the pressure drop between the inlet and outlet of the cartridge:

$$\Delta p \approx \frac{2L}{D_h} \frac{\rho V_0^2}{g_0} f(Re)$$

where $\rho$ is the density of the fluid; $g_0$ is the acceleration due to gravity; and f is a friction factor which is determined semi-empirically. For compact recombiners, an appropriate correlation is:

$$f(Re) = \frac{7(1-\epsilon)}{2\epsilon^3 Re^{2/3}} \sum_{i=0}^{3} b_i Re^i$$

where $16,000 \geq Re \geq 1,000$, $b_0 = 2$, $b_1 = 6.10^{-4}$, $b_2 = -3.10^{-8}$ and $b_3 = 7.10^{-13}$. The recombiner void fraction, $\epsilon$, is given by:

$$\epsilon = N_0 \frac{D_h}{d_i}$$

and the coefficient in $f(Re)$ accounts for flow-blockage effects.

Figure 3:
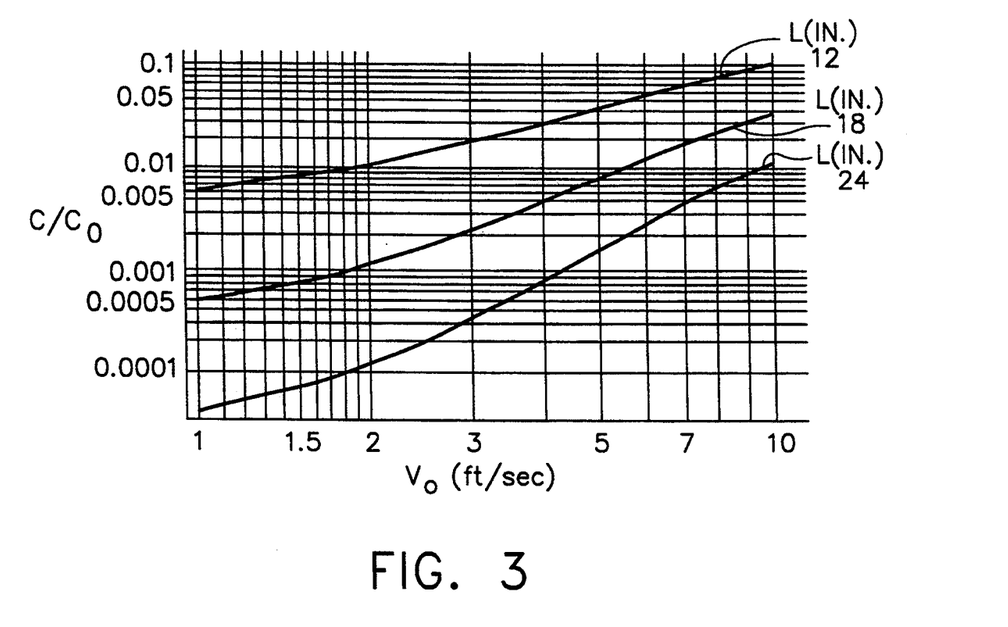
FIGS. 3 and 4 are logarithmic graphs in which the outlet concentration ratio and the overall pressure drop are respectively plotted against the mean velocity of flow through a catalytic recombiner cartridge made in accordance with the invention.

The outlet concentration ratio for a recombiner cartridge made in accordance with the first preferred embodiment is shown in FIG. 3. The cartridge in this case has 33 concentric shells/inch, each shell having 30 holes/inch$^2$ of diameter 79 mils and a thickness of 12 mils. The mean spacing of the shells is 30 mils, the void fraction is 80%, and the linear density of a 9-inch-diameter assembly is about 3 lb$_m$/inch.

This recombiner design reduces the outlet concentration of oxidizing agents by a factor of 1000 for a length L of 18 inches at a rated flow of 1.8 ft/sec. The graph shows that the length must increase as the flow rate increases in order to maintain a constant outlet concentration. Thus, a 24-inch length is required at a rated flow of 4.3 ft/sec to obtain the same outlet concentration ratio. This can be achieved by placing 6-inch-long cartridges in series in order to accommodate different flow specifications in pipes of the same inside diameter.

Figure 4:
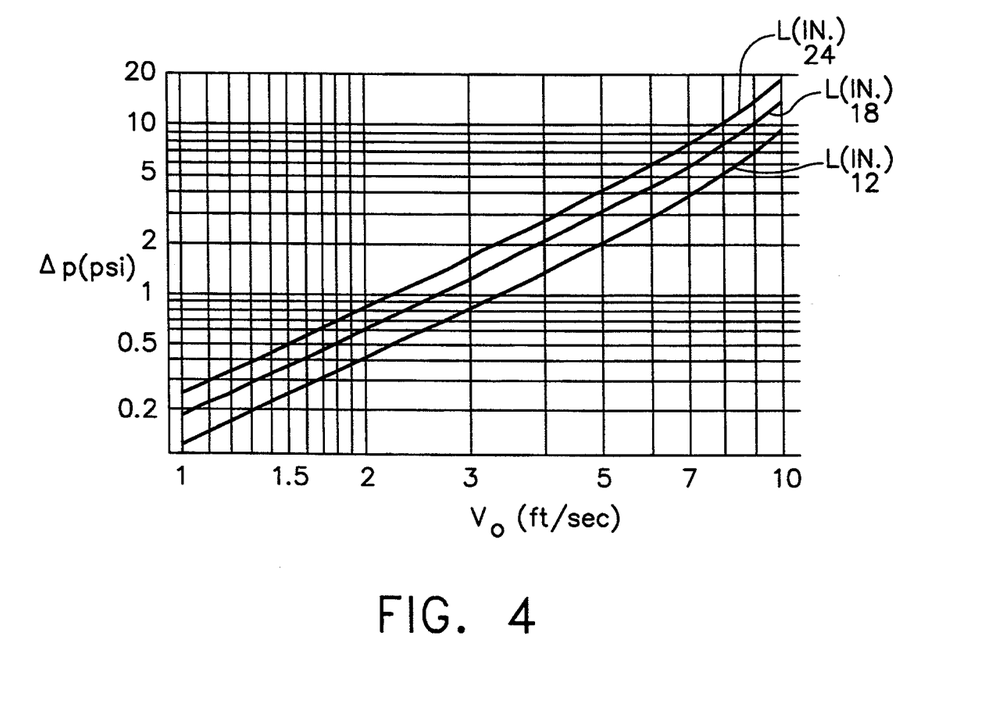

Pressure drop increases with overall length and flow velocity, as shown in FIG. 4. The magnitude of $\Delta p$ is not sensitive to the alignment of cartridges or to details of the perforation design. Form drag is the major contributor to pressure drop in a compact design.

Figure 5:
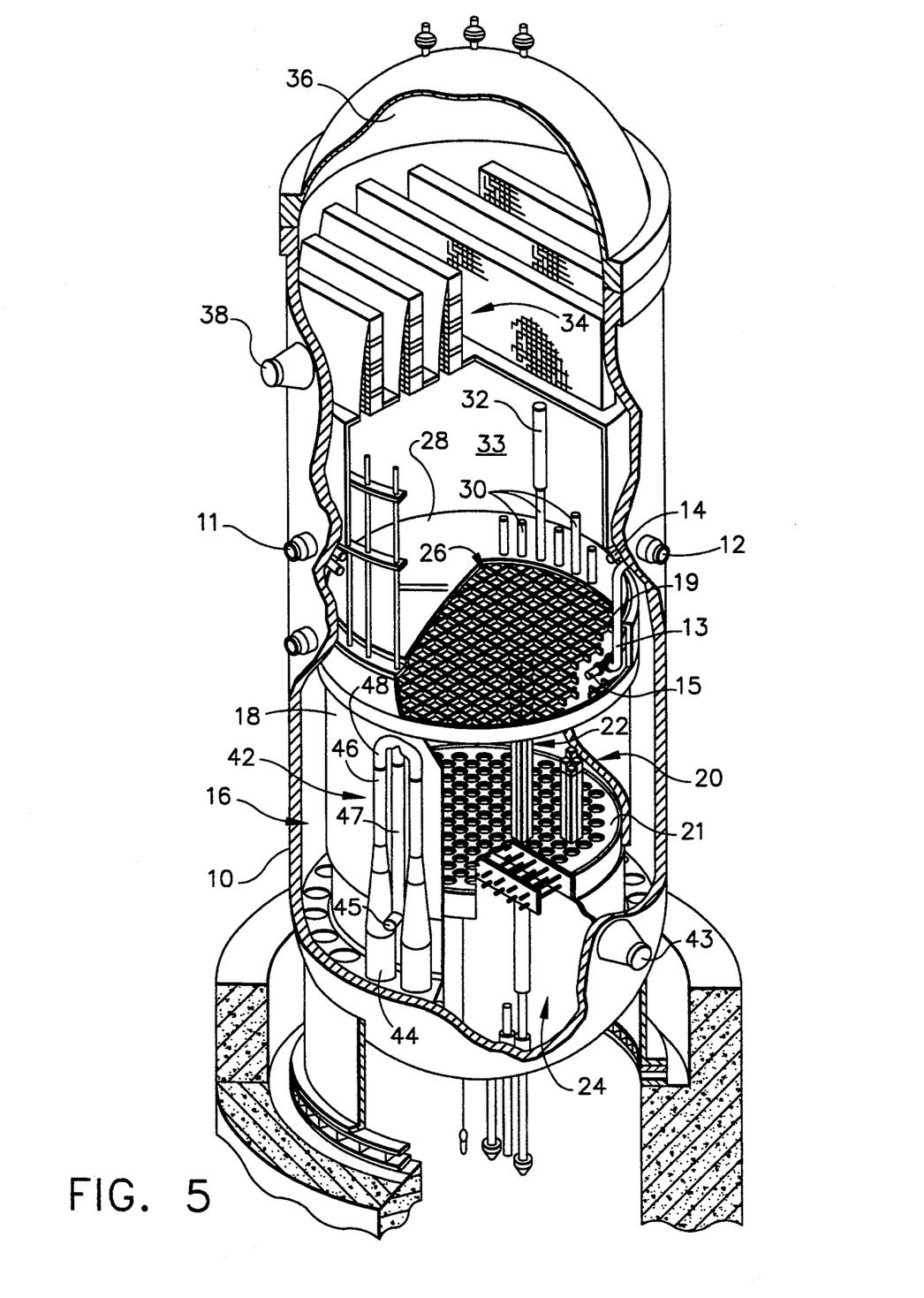
FIG. 5 is a schematic showing a partially cutaway perspective view of a conventional BWR in which the catalytic recombiner cartridge of the invention can be installed.

The catalytic recombiner cartridges in accordance with the preferred embodiments of the invention can be installed in a BWR of the type depicted in FIG. 5. In such BWRs, feedwater is admitted into a reactor pressure vessel (RPV) 10 via a feedwater inlet 12 and a feedwater sparger 14, which is a ring-shaped pipe having suitable apertures for circumferentially distributing the feedwater inside the RPV. A core spray inlet 11 supplies water to a core spray sparger 15 via core spray line 13. The feedwater from feedwater sparger 14 flows downwardly through the downcomer annulus 16, which is an annular region between RPV 10 and core shroud 18.

Water flowing through downcomer annulus 16 then flows to the core lower plenum 24 and into core 20, which comprises numerous fuel assemblies 22 (only two 2×2 arrays of which are depicted in FIG. 5). Each fuel assembly is supported at the top by top guide 19 and at the bottom by core plate 21. A mixture of water and steam exits the core and enters core upper plenum 26 under shroud head 28. Core upper plenum 26 provides standoff between the steam-water mixture exiting core 20 and entering vertical standpipes 30, the latter being disposed atop shroud head 28 and in fluid communication with core upper plenum 26. The steam-water mixture flows through standpipes 30 and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is withdrawn from the RPV via steam outlet 38.

The BWR also includes a coolant recirculation system which provides the forced convection flow through the core needed to achieve the required power density. A portion of the water is sucked from the lower end of the downcomer annulus 16 via recirculation water outlet 43 and forced by a centrifugal recirculation pump (not shown) into jet pump assemblies 42 (only one of which is shown) via recirculation water inlets 45. The BWR has two recirculation pumps, each of which provides the driving flow for a plurality of jet pump assemblies. The pressurized driving water is supplied to each jet pump nozzle 44 via an inlet riser 47, an elbow 48 and an inlet mixer 46 in flow sequence.

The catalytic recombiner cartridge in accordance with the preferred embodiments of the invention can be installed at key locations in the reactor, e.g., in the inlet mixers 46, in the recirculation water outlets 43 or in the core spray sparger 15. Each of these are locations with high concentrations of dissolved oxygen and hydrogen peroxide. Preferably, hydrogen gas is injected upstream of the cartridges.

If cartridges are installed in the inlet mixers, the recirculation water and reactor vessel downcomer water (normally having high concentrations of dissolved oxygen and hydrogen peroxide) will flow over the recombiner cartridge surfaces and react with a small hydrogen gas addition to the feedwater. Thus, the catalytically reacted water entering the core lower plenum 24 via the jet pump nozzle 44 through the jet pump throat will be very low in dissolved oxidizing agents. Consequently, the ECP is reduced below the SCC threshold, preventing SCC from occurring in this difficult and costly to repair area. In the absence of the recombiner cartridge, the lower plenum components, such as vessel bottom-head penetrations and access-hole covers, would be susceptible to SCC.

The catalytic recombiner cartridge of the invention can be installed in a cylindrical pipe using shim rings. In the case where the diameter of the pipe is decreasing in the downstream direction, the cartridge can be installed with a shim ring wedged between the upstream end of the cartridge and the pipe wall.

Although the preferred embodiments have been disclosed in the specific context of BWRs, in principle the invention is applicable to any system made of austenitic stainless steels subject to corrosion from low concentrations of dissolved chemical species from diverse sources. In addition, persons of ordinary skill in the art of nuclear reactor engineering will recognize that the geometry of the catalytic recombiner cartridge in accordance with the invention will depend on the specific design of the component in which the recombiner cartridge is to be installed. Moreover, the structure disclosed herein can be made from catalytic material other than water recombination catalyst to form catalytic reactors other than water recombiners.

The preferred embodiments have been disclosed for the purpose of illustration only. Variations and modifications of those embodiments will be readily apparent to mechanical engineers of ordinary skill. For example, the cylindrical shells or planar sheets could be supported in a concentric or parallel array respectively by rounded protuberances distributed over the surfaces instead of by welded spacers. In accordance with a further alternative, shells of rectangular or square section could be used in place of the hexagonal shells of the third preferred embodiment. This variation would be especially useful in pipes of rectangular or square section. All such variations and modifications are intended to be encompassed by the claims appended hereto.

We claim:

1. A catalytic reactor cartridge for installation in a pipe having liquid flowing therethrough, said liquid having first and second reactants dissolved therein, comprising:

first thin sheet means for catalyzing the reaction of said first and second reactants in said liquid, said first thin sheet means having a multiplicity of means for generating turbulence distributed thereon, said turbulence generating means causing repeated diminishment of a boundary layer thickness of liquid flowing along the surfaces of said first thin sheet means, said first thin sheet means having a thickness in the range of 10 to 12 mils; and means for rigidly supporting said first thin sheet means in a spaced array with said first thin sheet means extending in a predetermined direction.

2. The catalytic reactor cartridge as defined in claim 1, wherein said first thin sheet means comprises a first plurality of mutually parallel planar thin sheets made of catalytic material.

3. The catalytic reactor cartridge as defined in claim 2, wherein said supporting means comprises:
   a first hexagonal shell surrounding said first plurality of thin sheets, said thin sheets of said first plurality being connected to said first hexagonal shell;
   a first spacer connected to said first hexagonal shell and to one end of each of said thin sheets; and
   a second spacer connected to said first hexagonal shell and to another end of each of said thin sheets.

4. The catalytic reactor cartridge as defined in claim 3, wherein said first hexagonal shell is made of said catalytic material and has a respective multiplicity of means for generating turbulence distributed thereon.

5. The catalytic reactor cartridge as defined in claim 1, wherein said first thin sheet means comprises a first plurality of concentric thin cylindrical shells made of catalytic material.

6. The catalytic reactor cartridge as defined in claim 5, wherein said supporting means comprises:
   a first spacer connected to one end of each of said cylindrical shells of said first plurality;
   a second spacer connected to another end of each of said cylindrical shells of said first plurality; and
   a rigid member connected to said first and second spacers to resist relative rotation of said first and second spacers.

7. The catalytic reactor cartridge as defined in claim 1, wherein said first thin sheet means comprises a wound thin sheet made of catalytic material, adjacent windings of said wound thin sheet being spaced by a plurality of protuberances formed on said sheet.

8. The catalytic reactor cartridge as defined in claim 1, further comprising a second thin sheet means made of said catalytic material, said second thin sheet means having a multiplicity of means for generating turbulence distributed thereon, and means for rigidly supporting said second thin sheet means in a spaced array with said second thin sheet means extending in said predetermined direction.

9. The catalytic reactor cartridge as defined in claim 8, wherein said supporting means comprise:
   a first spacer connected to one end of said first thin sheet means;
   a second spacer connected to another end of said first thin sheet means and to one end of said second thin sheet means; and
   a third spacer connected to another end of said second thin sheet means.

10. The catalytic reactor cartridge as defined in claim 1, wherein said multiplicity of turbulence generating means reduces the mass-transfer surface area of each of said sheets by up to 15%.

11. The catalytic reactor cartridge as defined in claim 1, wherein each of said multiplicity of turbulence generating means is a perforation.

12. The catalytic reactor cartridge as defined in claim 11, wherein each of said perforations is a circular hole having a predetermined diameter.

13. The catalytic reactor cartridge as defined in claim 1, wherein said catalytic material comprises stainless steel alloy containing a noble metal.

14. The catalytic reactor cartridge as defined in claim 1, wherein said liquid is water and the surfaces of said catalytic material catalyze the recombination of hydrogen and oxygen into water.

* * * * *